United States Patent [19]

Takahashi

[11] Patent Number: 4,672,009
[45] Date of Patent: Jun. 9, 1987

[54] MAGNETIC RECORDING MEDIUM WITH VERTICALLY ORIENTED MAGNETIC PARTICLES

[75] Inventor: Yasunori Takahashi, Tokyo, Japan

[73] Assignee: Saiteku Corporation, Tokyo, Japan

[21] Appl. No.: 678,976

[22] Filed: Dec. 6, 1984

[30] Foreign Application Priority Data

Dec. 15, 1983 [JP] Japan ............... 58-235022

[51] Int. Cl.$^4$ ............... G11B 5/68; G11B 5/70
[52] U.S. Cl. ............... 428/694; 428/900; 428/328; 428/329; 428/64; 427/128
[58] Field of Search ............... 428/694, 328, 329, 900, 428/64; 427/128

[56] References Cited

U.S. PATENT DOCUMENTS

| | | |
|---|---|---|
| 2,796,359 | 6/1957 | Speed ............... 427/48 |
| 3,047,428 | 7/1962 | Goto et al. . |
| 3,052,567 | 9/1962 | Gabor et al. ............... 428/335 |
| 3,117,065 | 1/1964 | Wootten . |
| 3,185,775 | 5/1965 | Camras . |
| 3,222,205 | 12/1965 | Karalus . |
| 3,573,099 | 3/1971 | Moore et al. . |
| 3,764,381 | 10/1973 | Brissonneau . |
| 3,767,464 | 10/1973 | Akashi et al. . |
| 3,853,676 | 12/1974 | Graves . |
| 4,024,299 | 5/1977 | Smeggil . |
| 4,034,410 | 7/1977 | Suzuki et al. . |
| 4,042,341 | 8/1977 | Smeggil . |
| 4,075,672 | 2/1978 | Manly ............... 401/120 |
| 4,109,287 | 8/1978 | Kawai et al. . |
| 4,144,585 | 3/1979 | Puchalska-Hibner . |
| 4,171,389 | 10/1979 | Gyorgy et al. . |
| 4,200,680 | 4/1980 | Sasazawa et al. . |
| 4,237,506 | 12/1980 | Manly . |
| 4,277,809 | 7/1981 | Fisher et al. . |
| 4,293,621 | 10/1981 | Togami . |
| 4,332,834 | 6/1982 | Takei . |
| 4,333,961 | 6/1982 | Bruce et al. . |
| 4,367,257 | 1/1983 | Arai et al. . |
| 4,371,590 | 2/1983 | Izumi et al. . |
| 4,386,114 | 5/1983 | Harms et al. . |
| 4,387,136 | 6/1983 | Saito et al. . |
| 4,388,367 | 6/1983 | Chen et al. ............... 428/694 X |
| 4,399,422 | 8/1983 | Nelson et al. . |
| 4,400,432 | 8/1983 | Bauxbaum et al. . |
| 4,407,894 | 10/1983 | Kadokura et al. ............... 428/694 X |
| 4,410,565 | 10/1983 | Kitamoto et al. . |
| 4,414,271 | 11/1983 | Kitamoto et al. . |
| 4,440,106 | 4/1984 | Greiner et al. . |
| 4,442,159 | 4/1984 | Dezawa et al. ............... 428/328 X |
| 4,447,467 | 5/1984 | Oguchi et al. . |
| 4,451,495 | 5/1984 | Homola et al. . |
| 4,456,661 | 6/1984 | Yamamoto ............... 428/694 X |
| 4,482,578 | 11/1984 | Akashi et al. . |
| 4,486,496 | 12/1984 | Dezawa et al. . |
| 4,508,752 | 4/1985 | Takei et al. . |
| 4,520,069 | 5/1985 | Kitamoto et al. . |
| 4,547,393 | 10/1985 | Asai et al. . |
| 4,559,573 | 12/1985 | Tanaka et al. . |
| 4,578,280 | 3/1986 | Greiner et al. . |

*Primary Examiner*—Nancy A. Swisher
*Attorney, Agent, or Firm*—Cushman, Darby & Cushman

[57] ABSTRACT

A film type magnetic recording medium including a film substrate, and a magnetic film with a plurality of needle shaped magnetic grains dispersed in the magnetic film oriented to be substantially perpendicular to the surface of the magnetic film and vertically overlap one another. The film is coated on the substrate and then dried in a magnetic field perpendicularly oriented to the film surface so that the grains are fixed in an orientation substantially perpendicular to the film surface.

13 Claims, 12 Drawing Figures

MAGNETIC RECORDING MEDIUM WITH VERTICALLY ORIENTED MAGNETIC PARTICLES

BACKGROUND OF THE INVENTION

1. Field of the Invention

The present invention relates to a magnetic recording medium, particularly a film type multi-layered magnetic recording medium which has an excellent recording or reproducing capability for high density magnetic recording such as digital recording, analogue recording or PCM (Pulse Code Modulation).

2. Description of the Prior Art

The ability of a magnetic recording medium is rated by the information storing capacity per unit area, that is, the recording density.

In order to increase the recording density, the prevailing opinion so far, both experimental and theoretical, has required a higher antimagnetic force (Hc) and thinner layer of the medium. This view has been based on the idea of utilizing the magnetic recording phenomenon by magnetizing the longitudinal component of the magnetic medium, that is by employing the horizontal magnetizing mode effectively.

Accordingly, the conventional coated magnetic recording media that were suited for analogue recording, for example, the medium produced by vertically arranging magnetic grains on a horizontally arranged magnetic grain layer on a substrate, or that suited for digital recording, for example the medium produced by arranging magnetic grains at random or horizontally. When these magnetic recording media are applied for high density recording, the residual magnetic poles are facing each other. This cause a state in which the magnetic poles strongly repel each other and the maximum value is around the center of the transfer of the demagnetizing field within the magnetic layer of the medium. Consequently, the distribution of magnetization is modified to that with a gradual gradient, and thus, in a high density magnetic recording where this transfer area is aligned with a slight shift, the amplitude, i.e. the magnetization rate, diminishes as the recording density is increased. Under these circumstances, to realize high density recording, an increase of the antimagnetic force of the medium or thinning of the film is applied to diminish the demagnetizing function.

However, thinning of the film causes problems such as the decrease of productivity, mechanical strength or the output power. Particularly in the case of a coated film, thinning the film to 0.8 micrometer or less lowers the mechanical strength. Furthermore, the increase of the antimagnetic force and thinning of the film creates problems in the relation of the magnetomotive force between the magnetic medium and the magnetic head at the time of write-in and read-out, SN ratio of the reproduced signal, AC or DC noise and the coarseness of the magnetic medium surface.

Moreover, such magnetic coating materials generally have the disadvantage that drying or hardening the coated film material after forming it coarsens the film surface. The cause thereof is thought to be that a solvent included in the coated film material serves to agitate the magnetic grains with whirling when the solvent evaporates. Accordingly, in the conventional method, after the above-stated process, the quality of the surface is improved by such methods as polishing or calendering, etc.

Whichever case, the conventional magnetic recording medium is characterized by the emphasis of either its horizontal or its vertical component, but it has never been attained the increase of the magnetic recording characteristic of both the horizontal and the vertical component, that is, the angular ratio (Br/Bs) of each. (Br denotes the magnetic flux density and Bs denotes the maximum magnetic flux density. The angular ratio: Br/Bs=1 is the ideal state.)

SUMMARY OF THE INVENTION

An object of the present invention is to provide a film type magnetic recording medium which has each angular ratio (Br/Bs) of 0.6 or more of both the horizontal component and the vertical component to realize high density magnetic recording and has an excellent property for both analogue recording and the digital recording.

Another object of the present invention is to provide a method for manufacturing the said medium.

A film type multi-layered magnetic recording medium comprised of a film coated on a substrate in which film needle-shaped magnetic grains are oriented with their longitudinal axes perpendicular to the film surface in a multi-layered state and having the film thickness of 1.1 to 2.0 times the average length of the grains, can accomplish the said object, that is, it has an excellent property in that the angular ratios (Br/Bs) of both horizontal and the vertical components respectively are 0.6 or more. As a result, it is possible to realize high density magnetic recording.

The above said film type multi-layered magnetic recording medium is manufactured by applying a fluid film formation material in which needle-shaped magnetic grains are dispersed to form a coated film having the thickness of 1.1 to 2.0 times the average length of the magnetic grains on a substrate, then drying or hardening the film formation material in a magnetic field perpendicularly oriented toward the film surface.

DETAILED DESCRIPTION OF THE PREFERRED EMBODIMENTS

The first invention is related to a film type multi-layered magnetic recording medium comprised of a film coated on a substrate in which coated film needle-shaped magnetic grains are oriented with their longitudinal axes perpendicular to the film surface in a multi-layered state and having the film thickness of 1.1 to 2.0 times the average length of the grains.

Herein, the term "multi-layered" does not denote a state where the magnetic grains are aligned in a single layer perpendicular to the film surface, but a state where the magnetic grains overlap one another and some intrude into the range of others.

Figure 1:
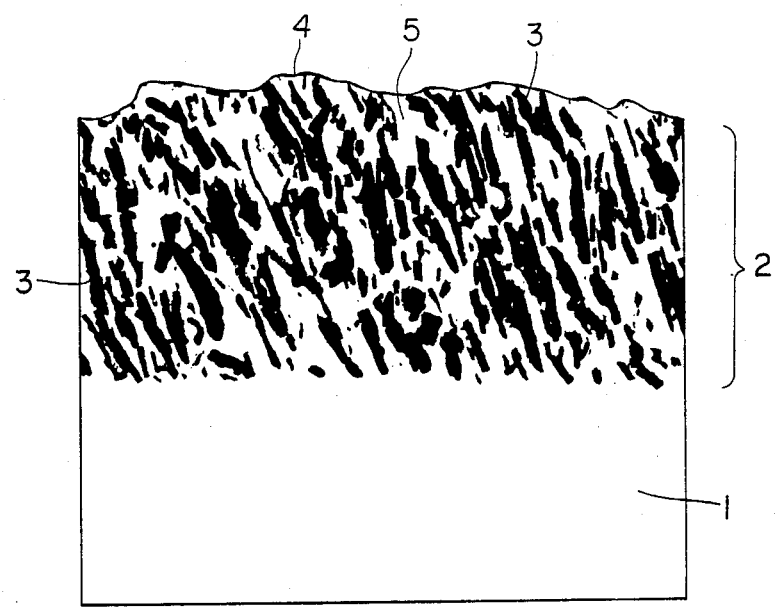
FIG. 1 is a tracing of a microphoto enlarged thirty-thousand times, showing the cross-section of the film type multi-layered magnetic recording medium of the present invention.

FIG. 1 is a tracing of a microphotograph (enlarged 30 thousand times) of a vertical cross-sectional view of the film type multi-layered magnetic recording medium of the present invention. The numeral (1) denotes a substrate (base film); (2) denotes a coated film layer. In this coated film, it can be seen that the needle-shaped magnetic grains (3), with their longitudinal axes perpendicular to the film surface (4), overlap one another and some intrude into the range of others. This state is referred to as "multi-layered" in this invention. (5) is the film material.

To facilitate understanding, the second invention will be now explained.

The principle of this invention is that a fluid film formation material in which needle-shaped magnetic grains are dispersed is applied to form a coated film having the thickness of 1.1 to 2.0 times the average length of the magnetic grains, then, the film formed material is dried or hardened to fix with a heating unit (for example, nesa glass, etc.) in a magnetic field perpendicular to the film surface, i.e., applying a vertical magnetic flux perpendicular to the film surface.

In the magnetic field perpendicular to the film surface, the longitudinal axes of the needle-shaped magnetic grains in the fluid film formation material are arranged perpendicular to the film surface. Thus, by drying or hardening the fluid film formation material to fix, it is possible to obtain a film type multi-layered magnetic recording medium in which needle-shaped magnetic grains are longitudinally arranged perpendicular to the film surface.

In this process, the strength of the applying magnetic field should be 2.5 to 10 times, ideally 4 to 8 times as great as the antimagnetic force (Hc) of the magnetic grains.

For example, when magnetic grains of Hc 400 Oe is used, the strength of the magnetic field to be employed is 1000 Oe to 4000 Oe, most preferably 1600 Oe to 3200 Oe. In order to provide this magnetic field, a permanent magnet or an electromagnet can be utilized.

The present invention has the feature that commercial magnetic grains can be utilized for the present invention, and it is possible to obtain a magnetic recording medium having excellent characteristics without using costly grains of high antimagnetic force.

Furthermore, though various kinds of the film materials can be utilized, it is possible to easily manufacture the multi-layered magnetic recording medium of the present invention particularly by using polyvinyl butyral. Details will be explained in the Example 1 and 2.

The present invention has an excellent effect in both disc and tape-forms, irrespective of the form of the magnetic film.

Now, the device for accomplishing the method of the present invention is explained in detail on the basis of the accompanying drawings.

Figure 2:
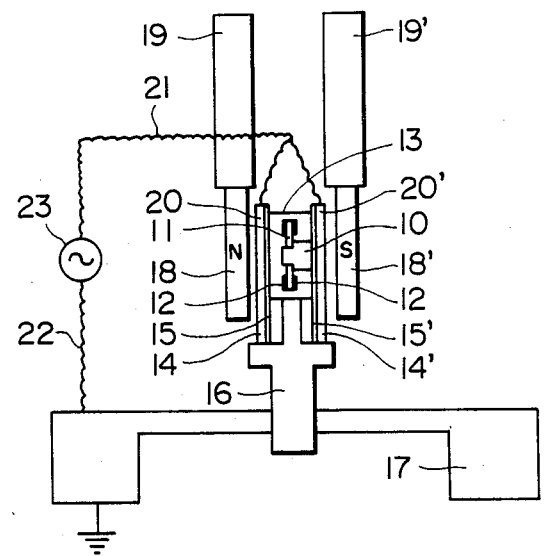
FIGS. 2, 3, 4, 5 and 6 are diagrammatic sectional views of the devices for accomplishing the method of the present invention for a magnetic device.

In FIG. 2, (11) denotes a disc substrate attached to an installation base (10), and (12) denotes a film obtained by applying magnetic coating material (a mixture of magnetic grains and fluid film formation materials) to the disc substrate.

This disc substrate is stored in a non-metal vessel (13). Nesa glasses (14), (14') arranged at the both ends of the vessel (13) are attached to a conductive metal supporting base (16) so that the nesa glass surface (15) and (15') are positioned substantially against the each surface of the disk. The supporting base (16) is attached on a conductive metal foundation (17). Moreover, the vertical magnetic field toward the coated film is generated from both ends of the magnetic poles (18), (18') through both nesa glasses by means of electromagnets (19), (19'). The hardening of this coated film formation material is carried out as follows. The nesa electrodes (20), (20') at the upper part of the nesa glasses are connected to a power source (23) through a lead wire (21), then connected to the ground through a lead wire (22). As the lower parts of the nesa glasses are connected to the ground through the conductive metal supporting base (16) and conductive metal foundation (17), an electric circuit is formed. The nesa glasses are heated by the power source (23) (AC 100 V, Current about 1.6 A, Resistance of the nesa film 100 Ohm) to arrange the temperature to the appropriate solidifying temperature of the coated film formation material.

Figure 3:
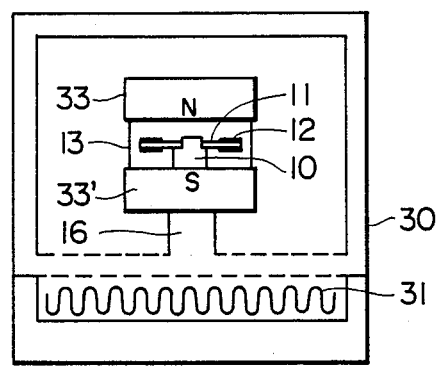

FIG. 3 shows an example for accomplishing the present invention by means of a hardening furnace (30). A disc substrate (11) having a magnetic coating film (12) on one side or both sides is attached to the installation base (10) in a nonmagnetic vessel (13). Permanent magnets (33), (33') are respectively placed on the upper and the lower sides of the nonmagnetic vessel (13) so as to provide a magnetic field perpendicular to the coating film surface. The overall construction described above is supported on the supporting base (16) in the hardening furnace. A heater (31) is provided on the bottom of the hardening furnace to harden the coated film by setting the temperature of the heater.

Figure 4:
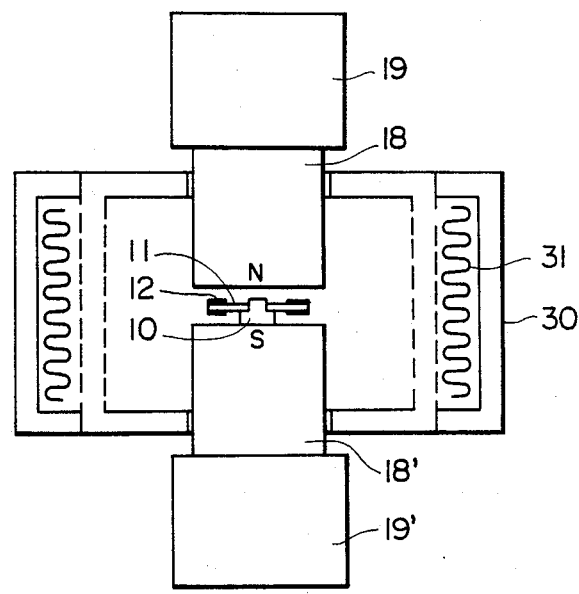

FIG. 4 shows an example where electromagnets (19), (19') are utilized in place of the permanent magnets in the device of FIG. 3. Both magnetic poles extended enough so as to make both magnetic poles (18), (18') of the electromagnets approach a magnetic film (12) coated on a disc substrate (11) as closely as possible. A substrate (11) having the coated film (12) is placed on an installation base and is inserted between both magnetic poles. The hardening is carried out by setting the temperature of heaters (31) provided on both side walls.

Figure 5:
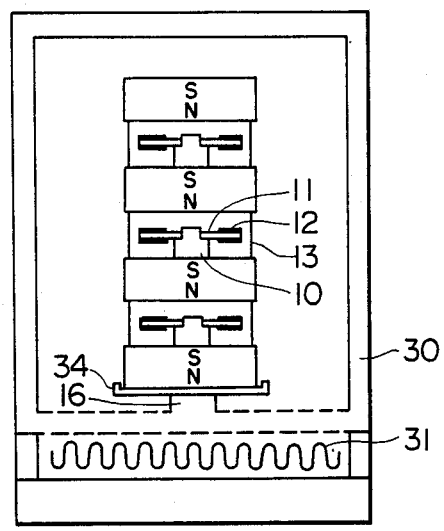

FIG. 5 is a diagrammatic sectional view showing a manufacturing device for simultaneously treating a plurality of discs. A disc substrate (11), where a magnetic film (12) is coated by a rotary coating method is provided on an installation base (10) in a vessel (13) and a plurality of vessels are respectively inserted into the intervals of plural steps of permanent magnets (33). And the overall construction described above is placed on a supporter (34) and fixed via supporting base (16) on hardening furnace (30) provided a heater (31). This heater serves to harden the magnetic film at once.

Figure 6:
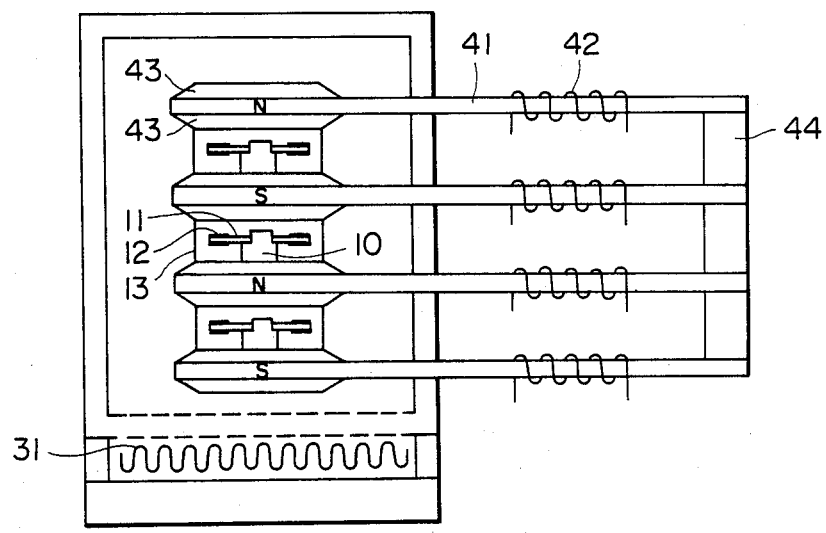

FIG. 6 is a cross-sectional view showing a manufacturing device utilizing electromagnets in place of the permanent magnets in the device of FIG. 5. Namely, it is the device employing the style in which plural steps of electromagnets are arranged. (41) denotes magnet cores and (42) denotes coils and the coils are respectively wound around the cores. The end portions of the magnet cores providing magnetic poles (43) on both surfaces so as to provide an effectual vertical magnetic field, and a plurality of these constructions are stacked similarly with that of FIG. 5. Subsidiary cores (44) are respectively provided for these constructions to prevent the magnetic field from leaking to the outside; hence, magnetically closed circuits are constructed. The magnetic poles should be arranged as shown in the drawing. The setting of this polarity is defined by the direction of the current flowing through the coil and the strength of the vertical magnetic field is set by the amplitude of the current.

Figure 7:
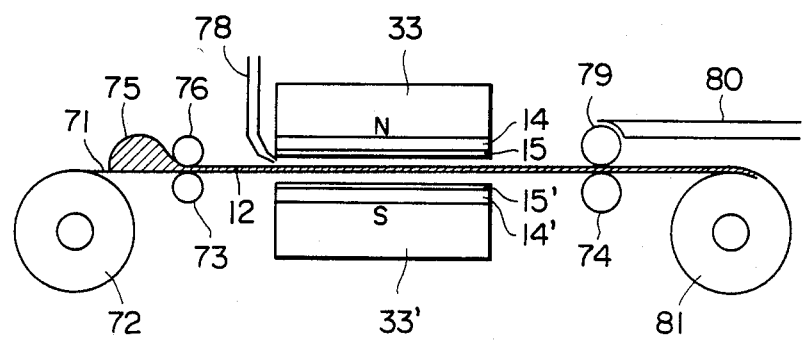
FIG. 7 is a sectional view of the device for accomplishing the method of the present invention for a magnetic tape.

FIG. 7 shows an example where the present invention is arranged to be adapted particularly for the manufacture of the magnetic tape. Namely, the numeral (71) of this Figure denotes a tape material (polyester, etc.) which is supplied from a tape roll (72) via tape-supplying rollers (73), (74) at a predetermined speed. The magnetic coating material (75) forms a film of predetermined thickness on the tape by means of a coating film thickness arranging roller (76). The magnetic coating film (12) which has not yet dried or hardened is passed between one pair of vertical magnetic field generators (33), (33') (electromagnets or permanent magnets). In this process, the current from a power source is supplied to both nesa electrodes provided on nesa glasses (14), (14') disposed on the vertical magnetic field generators to heat the film (12) passing between the nesa glasses. It is desirable to always discharge a certain flow rate of air or $N_2$ gas, etc. to the coating film surface from a gas stream discharger pipe (78) and to control the temperature of the film to be about 60° C.–180° C. by the heat emission of the nesa glasses using the discharge of the gas or air in order to harden the magnetic coating materials.

Furthermore, a reverse rotating roller (79) for removing projections is rotated in reverse to apply a pressure of 0.1–10 g/mm² to the coating film, and by the function of this roller, the solidified projections on the magnetic film are removed. The powdery fragments removed from this roller (79) are discharged to the outside by an absorber (80). The completed magnetic tape is wound by a winding roller (81).

The method of the present invention will be explained on the basis of the following examples, then the characteristics of the film type multi-layered magnetic recording medium obtained by this invention will be explained.

EXAMPLE 1

PVB (polyvinyl butyral) powder 70 g and needle-shaped gamma-$Fe_2O_3$ magnetic grains (average length 0.36 micrometer X the average diameter 0.045 micrometer, the antimagnetic force 382 Oe) 700 g were put into a kneader or a dispersion mill and were mixed for about 15 minutes therein. Next, cellosolve acetate 250 g was gradually added to the mixture and the kneader mixing or dispersion mixing was carried out for about 4 hours. The mixture 480 g was put into a 3 liter ball mill pot or into a 3 liter grain mill device and cellosolve acetate 700 g was added therein. 7 days with the ball mill or 24 hours with the grain mill were necessary to disperse the magnetic grains. Lastly, phenol resin 120 g, 40% butyl cellosolve solution of epoxy resin 300 g, and butyl cellosolve 500 g were added therein and mixed to form a magnetic disc coating material.

Next, this coating material (viscosity was 170 cp at room temperature) was applied to form coated films having the thickness in the range of 0.45 micrometer to 2.40 micrometer on purified aluminum substrates or on aluminum substrates where 1 micrometer thickness of clear (resin) covering was provided and also was applied to form coated films having the thickness in the range of 0.45 micrometer to 15.00 micrometer on polyimide film substrates by means of the spin or roll method. Then, the coated film material is hardened under a perpendicular magnetic field of 2500 Oe, that is, a magnetic field 6.5 times as great as the Hc (antimagnetic force) of the magnetic grains at a temperature of 200° C. for 2 hours with the manufacturing device in FIG. 2.

When the film type magnetic recording medium formed as stated above was cut vertically toward the film surface and a microphoto of the cross-sectional view was observed. It was confirmed that the longitudinal axes of the needle-shaped magnetic grains were arranged perpendicular to the film surface in the multi-layered state similar to that as shown in FIG. 1.

The results of measuring the angular ratios (Br/Bs, Bs: 5000 Oe) of the vertical component and the horizontal one are shown with the antimagnetic field (H=4πB) correction of the angular ratio of the vertical component in the Table 1, 2 and 3.

TABLE 1

Relation between the coated film thickness and the angular ratio of the film type multi-layered magnetic recording medium Bs: 5000 Oe substrate: Polyimide film (75 micrometer thickness)

| coated film thickness (micrometer) | ratio of the coated film thickness to the length of the magnetic grains | angular ratio factor: | | |
|---|---|---|---|---|
| | | vertical component ● | corrected vertical component ○ | horizontal component △ |
| 0.45 | 1.25 | 0.64 | 1.00 | 0.85 |
| 0.60 | 1.67 | 0.56 | 0.85 | 0.78 |
| 1.20 | 3.33 | 0.46 | 0.70 | 0.60 |
| 2.40 | 6.67 | 0.38 | 0.64 | 0.41 |
| 5.00 | 13.89 | 0.37 | 0.56 | 0.34 |
| 10.00 | 27.78 | 0.36 | 0.51 | 0.31 |
| 15.00 | 41.67 | 0.33 | 0.49 | 0.29 |

TABLE 2

Relation between the coated film thickness and the angular ratio of the film type multi-layered magnetic recording medium Bs: 5000 Oe substrate: Aluminum (2 mm thickness)

| coated film thickness (micrometer) | ratio of the coated film thickness to the length of the magnetic grains | angular ratio factor: | | |
|---|---|---|---|---|
| | | vertical component | corrected vertical component ○ | horizontal component △ |
| 0.45 | 1.20 | 0.58 | 0.90 | 0.77 |
| 0.60 | 1.67 | 0.54 | 0.87 | 0.70 |
| 1.20 | 3.33 | 0.35 | 0.84 | 0.39 |
| 2.40 | 6.67 | 0.33 | 0.77 | 0.35 |

TABLE 3

Relation between the coated film thickness and the angular ratio of the film type multi-layered magnetic recording medium Bs: 5000 Oe substrate: Aluminum with 1 micrometer thickness clear covering

| coated film thickness (micrometer) | ratio of the coated film thickness to the length of the magnetic grains | angular ratio factor: | | |
|---|---|---|---|---|
| | | vertical component | corrected vertical component | horizontal component |
| | | | symbol: ○ | Δ |
| 0.45 | 1.25 | 0.61 | 0.98 | 0.82 |
| 0.60 | 1.67 | 0.59 | 0.92 | 0.75 |
| 1.20 | 3.33 | 0.49 | 0.87 | 0.35 |
| 2.40 | 6.67 | 0.45 | 0.82 | 0.32 |

Figure 8:
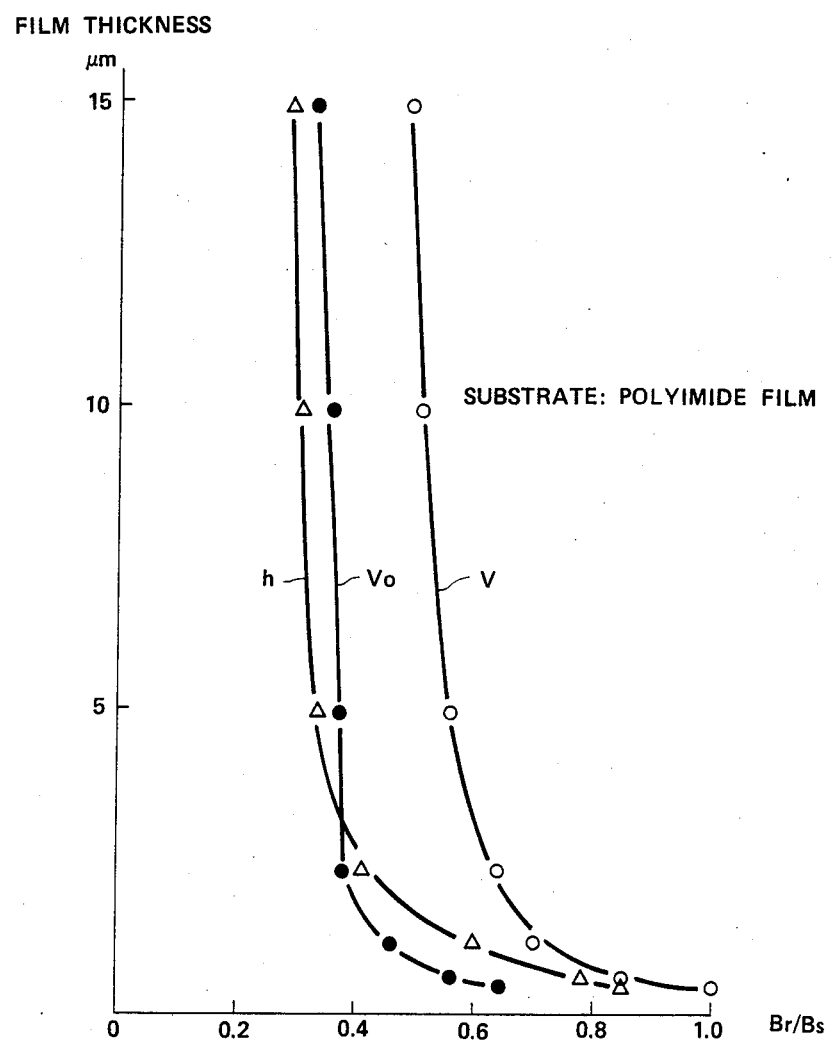
FIGS. 8, 9, 10, 11 and 12 show the characteristic of the film type multi-layered magnetic recording medium of the present invention.

FIG. 8 shows the relation between the film thickness and the angular ratio of the polyimide film in the Table 1. Herein, the X axis denotes the angular ratio and the Y axis denotes the film thickness (micrometer). The curve h, the curve $v_O$, and the curve v respectively denote a horizontal component, a vertical component and a corrected value of the vertical component with the antimagnetic force.

Figure 9:
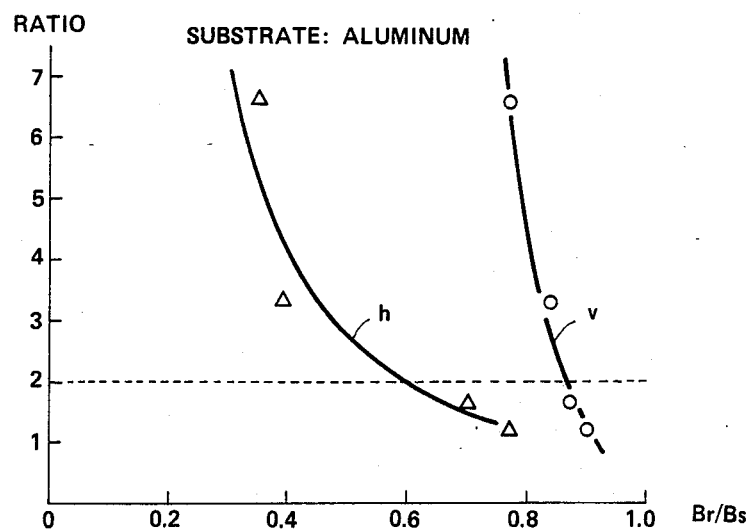
Figure 10:
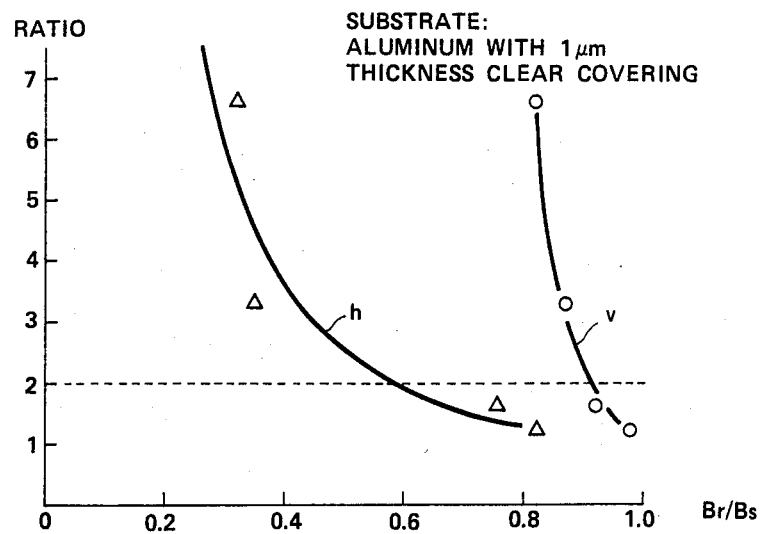
Figure 11:
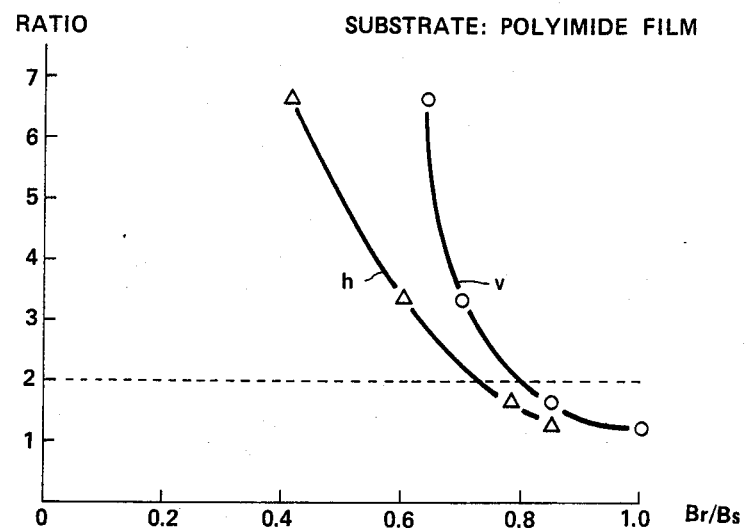

FIG. 9-11 show the changing state of the value of horizontal component (h) and the corrected value of the vertical component (v) of the angular ratio, where the Y axis denotes the ratio of the film thickness to the average length of needle-shaped magnetic grains and the X axis denotes the angular ratio.

FIGS. 9, 10, and 11 are respectively related to an aluminum substrate, said aluminum base with a clear resin covering and a polyimide film substrate.

Respective cases show that the value of the horizontal component and the corrected value of the vertical component of the angular ratio are 0.6 or more when the ratio of the film thickness to the average length of the magnetic grains is 2.0 or less.

This means that the film type multi-layered magnetic recording medium can utilize both horizontal and vertical components for magnetic recording and reproducing. That is, the film type multi-layered magnetic recording medium of the present invention should have the film thickness of less than 2.0 times the average length of needle-shaped magnetic grains. The reason to set the lower limit of this ratio to 1.1 is that it is necessary to set the film thickness slightly more than the average length of the magnetic grains to form the vertical multi-layered construction of the needle-shaped magnetic grains in the film. The devices shown in FIGS. 3 and 4 provided similar effects.

The coarseness of the film surface of the vertically aligned disc for the multi-layered magnetic recording (in the case of 3000 Oe, an aluminum substrate and 0.60 micrometer thickness of the coated film) immediately after hardening was Ra=0.024 micrometer. This result is better than that of a similarly processed conventional non-aligned disc, Ra=0.085 micrometer, or of a horizontally aligned disc, Ra=0.4–0.06 micrometer.

EXAMPLE 2

To make magnetic coating material for a magnetic tape, PVB (polyvinyl butyral) powder 1.97 Kg and magnetic grains as used in Example 1, 20 Kg were put into a kneader or a dispersion mill and mixed for about 15 minutes. Next, cellosolve acetate 22.4 Kg was gradually added thereto and kneading or dispersion milling was carried out for 4 hours. 740 g of this mixture was put into a 3 liter ball mill pot (8 mm. balls, capacity 3 Kg) or a 3 liter grain mill, and as cellosolve acetate 405 g was added thereto, the dispersion of the magnetic grains was carried out for 7 days in the ball mill pot or for 24 hours in the grain mill. Next, 20% PVB butyl cellosolve solution 545 g was added and mixed to prepare the magnetic tape coating materials. Afterwards, this coating materials (viscosity 1200 cp) was coated on a polyester film (Mylar film) stored in the state of the purified surface at a film transport speed of 1.0 cm/sec by the device shown in FIG. 7 and while coating, the gap of the coating film thickness arrangement roller (76) was arranged to form various kinds of film thickness. This coating film in the undried state was passed through the vertical magnetic field and while passing, the film was rapidly dried by air stream and the heat in the air stream (in the range of 60° C. to 180° C.) caused by the electric current applied to the nesa film. Afterwards, it was passed through the reverse rotary roller (79) to remove projections. The characteristic of the magnetic coated film for a magnetic tape obtained by the above-stated process is shown in Table 4.

TABLE 4

Relation between the coated film thickness and the angular ratio of the film type multi-layered magnetic recording medium (tape)

Bs: 5000 Oe substrate: Mylar film (75 micrometer thickness)

| coated film thickness (micrometer) | ratio of the coated film thickness to the length of the magnetic grains | angular ratio factor: | | |
|---|---|---|---|---|
| | | vertical component | corrected vertical component | horizontal component |
| | | | symbol: ○ | Δ |
| 0.45 | 1.25 | 0.59 | 0.92 | 0.80 |
| 0.60 | 1.67 | 0.55 | 0.86 | 0.75 |
| 1.20 | 3.33 | 0.47 | 0.82 | 0.36 |
| 2.40 | 6.67 | 0.42 | 0.75 | 0.32 |

Figure 12:
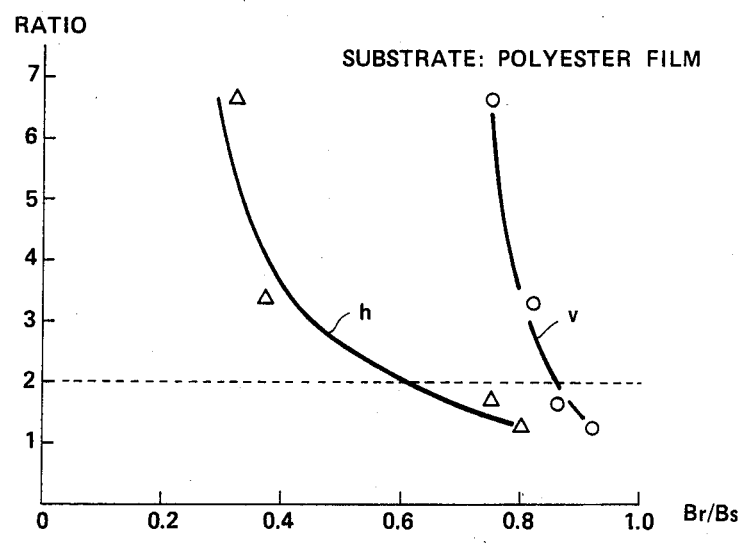

This is shown in FIG. 12. From Table 4 and FIG. 12, it is clear that excellent results can be obtained when the film thickness is 1.1 to 2.0 times the average length of the magnetic grains, even with Mylar film (polyester film).

Moreover, it was observed too that the strength of the coated film of the film type multi-layered medium of the present invention is excellent even in the case of a thin coated film.

I claim:

1. A film type magnetic recording medium comprising:
    a film substrate; and
    a magnetic film being a single layer coated on said substrate, said magnetic film having a plurality of needle shaped magnetic grains dispersed in said magnetic film creating a magnetic field with the longitudinal axes of said magnetic grains being substantially perpendicular to the surface of said magnetic film and having said magnetic grains vertically overlap one another.

2. The film type multi-layered magnetic recording medium according to claim 1, wherein the film material is polyvinyl butyral.

3. A medium as in claim 1 wherein said medium is a tape.

4. A medium as in claim 1 wherein said medium is a disc.

5. A medium as in claim 1 wherein said medium has an angular ratio of at least 0.6 in both horizontal and vertical components of said magnetic field.

6. A film type magnetic recording medium comprising:
   a film substrate; and
   a magnetic film being a single layer formed of polyvinyl butyral coated on said substrate, said magnetic film having a plurality of needle shaped magnetic grains dispersed in said magnetic film with the longitudinal axes of said magnetic grains being substantially perpendicular to the surface of said magnetic film and having said magnetic grains vertically overlap one another.

7. The film type multi-layered magnetic recording medium according to claim 6, wherein the substrate is an aluminum sheet.

8. The film type multi-layered magnetic recording medium according to claim 6, wherein the substrate is a plastic film.

9. The film type multi-layered magnetic recording medium according to claim 8, wherein the plastic film substrate is a polyimide film.

10. The film type multi-layered magnetic recording medium according to claim 8, wherein the plastic film substrate is a polyester film.

11. A film type magnetic recording medium according to claim 6 wherein a variable number of said magnetic grains intrude into the magnetic field range of others of said magnetic grains.

12. A film type magnetic recording medium according to claim 6 wherein said magnetic film has a thickness ranging between 1.1 to 2.0 times the average length of said magnetic grains.

13. A film type magnetic recording medium according to claim 6 wherein the ratio of magnetic flux density to the maximum magnetic flux density is at least 0.6 for the horizontal and vertical magnetic field components of said magnetic film.

* * * * *